United States Patent [19]

Japuntich

[11] Patent Number: 4,883,547

[45] Date of Patent: Nov. 28, 1989

[54] METHOD OF FORMING A HIGH EFFICIENCY RESPIRATOR

[75] Inventor: Daniel A. Japuntich, St. Paul, Minn.

[73] Assignee: Minnesota Mining and Manufacturing Company, St. Paul, Minn.

[21] Appl. No.: 317,530

[22] Filed: Mar. 1, 1989

Related U.S. Application Data

[62] Division of Ser. No. 22,258, Mar. 2, 1987, Pat. No. 4,827,924.

[51] Int. Cl.[4] .......... B32B 31/16

[52] U.S. Cl. .......... 156/73.4; 156/223; 156/224; 156/226; 156/257; 156/268; 156/292

[58] Field of Search .......... 156/211, 223, 224, 257, 156/268, 292, 62.8, 270, 73.4, 226, 227, 251; 128/206.12, 206.19, 206.21; 83/880; 206/260

[56] References Cited

U.S. PATENT DOCUMENTS

| | | | |
|---|---|---|---|
| Re. 24,549 | 10/1958 | Haliczer | 128/141 |
| Re. 30,782 | 10/1981 | van Turnhout | 264/22 |
| 3,500,825 | 3/1970 | Andersson et al. | 128/139 |
| 3,603,315 | 9/1971 | Becker | 128/146.2 |
| 3,664,335 | 5/1972 | Boucher et al. | 128/146.6 |
| 3,971,373 | 7/1976 | Braun | 128/146.2 |
| 3,985,132 | 10/1976 | Boyce et al. | 128/146.2 |
| 4,215,682 | 8/1980 | Kubik et al. | 128/205.29 |
| 4,248,220 | 2/1981 | White | 128/206.19 |
| 4,300,549 | 11/1981 | Parker | 128/206.19 |
| 4,319,567 | 3/1982 | Magidson | 128/206.19 |
| 4,384,577 | 5/1983 | Huber et al. | 128/206.19 |
| 4,417,575 | 11/1983 | Hilton et al. | 128/206.19 |
| 4,419,994 | 12/1983 | Hilton . | |
| 4,562,837 | 7/1986 | Schlobohm | 128/206.17 |
| 4,600,002 | 7/1986 | Maryyanek et al. | 128/206.19 |
| 4,606,341 | 8/1986 | Hubbard et al. | 128/206.19 |
| 4,630,604 | 12/1986 | Montesi | 128/206.15 |
| 4,641,645 | 2/1987 | Tayebi | 128/206.19 |
| 4,643,182 | 2/1987 | Klein | 128/201.25 |
| 4,684,570 | 8/1987 | Malaney | 428/296 |

FOREIGN PATENT DOCUMENTS

| | | |
|---|---|---|
| 0149590 | 3/1981 | European Pat. Off. . |
| 1589181 | 2/1971 | United Kingdom . |
| 2077112 | 11/1986 | United Kingdom . |

*Primary Examiner*—Michael W. Ball
*Assistant Examiner*—Michele K. Yoder
*Attorney, Agent, or Firm*—Donald M. Sell; Walter N. Kirn; Roger R. Tamte

[57] ABSTRACT

The invention provides a filtration face mask which has an expanded filtration surface area and high filter efficiency. The mask includes at least two sidewall portions generally extending away from the face of the wearer and away from an annular base. A frontal portion bridges the sidewall portions and at least two supporting arche structures are disposed at the junction of the sidewall and frontal portions.

13 Claims, 2 Drawing Sheets

METHOD OF FORMING A HIGH EFFICIENCY RESPIRATOR

This is a division of application Ser. No 22,258 filed Mar. 2, 1987, now U.S. Pat. No. 4,827,924.

TECHNICAL FIELD

The present invention relates to filtration face masks designed to cover the nose and mouth of a human wearer and particularly to masks having an expanded filtration surface area.

BACKGROUND

Filtration face masks (hereinafter masks) are used in a wide variety of applications when it is desired to protect a human's respiratory system from particles suspended in the air or from unpleasant or noxious gases.

Wearer comfort is paramount to overcome the frequently encountered resistance to use. In addition to the comfort derived from a proper fit to a human face, it is desirable that a mask require a minimum of effort to draw air in through the filter media. This is referred to as the pressure drop across a mask, or breathing resistance.

To reach higher levels of filter efficiency, more or thicker layers of filter material are typically used. If the filter area is held constant the addition of more layers of filter material raises the pressure drop across a mask. Provision of high efficiency face masks has been limited by the fact that the thicker filtration layers needed for such performance leave conventionally designated face masks with unacceptable pressure drops. Formation of face masks with a larger filter material surface area typically lowers the pressure drop, and masks having an increased filter surface area over that of a generally cup-like shaped mask are described in, for example, U.S. Pat. Nos. 4,248,220 and 4,417,575, and EPO application No. 149,590 A3. Masks disclosed in these references suffer from difficulties in manufacture and/or poor fit to the wearer's face. In addition, prior art attempts at increasing surface area have included the use of sharp pleats or folds in the filter material. While this is acceptable for thin, paper-like filter material it will not work when a thick filter material is used.

It is, therefore, highly desirable to provide a mask which has an increased filter media surface area over that of a cup-like shaped mask without the use of sharp pleats or folds, is exceptionally easy to manufacture, and is comfortable and firmly fitting on the face of a typical human wearer.

SUMMARY OF THE INVENTION

These and other advantages are provided by the expanded area filtration face mask of the invention which is adapted to cover the mouth and nose of a wearer of the mask and comprises a filter member having a shape retaining annular base disposed around the open edge of the mask and adapted to fit conformingly against the face of a wearer of the mask; at least two sidewall portions generally extending away from the face of the wearer and away from the annular base; a frontal portion bridging the sidewall portions; and at least two supporting arch structures disposed at the junction of the sidewall and frontal portions, and intersecting the annular base; the interior surface area of the filter member defined by the sidewall and frontal portions being greater than that of the segment of a sphere defined (i.e., separated from the rest of the sphere) by a plane having the same area as enclosed by the annular base and having a height equal to that of the inside of the mask, whereby the pressure drop through the filter member is no more than about 40 mm $H_2O$ at a flow rate of 85 liters/minute. This flow rate is within the range of the standard for accepted breathing resistance. Preferably, the mask is constituted such that upon removal of the annular base, the sidewall portions can be folded along the supporting arches in face-to-face contact with the frontal portion to form a flat structure having an at least partially curved perimeter.

An advantage of face masks as described is that they are adapted to provide high efficiency filtration. For example, face masks of the invention can have a thickness such that the mask allows no more than an approximately 3 percent penetration of 0.3 micrometer-diameter particles of dioctyl phthalate (DOP) at a flow rate of 85 liters/minute with a pressure drop of less than 40 mm $H_2O$, and preferably no more than an approximately 0.1% penetration.

The invention further contemplates a method for producing a mask blank comprising the steps of bonding filter sheets together along a pair of oppositely disposed arches, the filter sheets comprising at least one layer of filter material, removing the sheet lying outside of the arches to form a filter blank, and slitting one of the sheets between the arches. Slitting is obviated if a two piece sheet is used. The blank may then be opened along the slit so as to form a cup-like filter member having a pair of side wall portions formed from the slit sheet and a frontal portion formed from the un-slit sheet which bridges the side wall portions. A shape retaining annular base may be formed which is disposed around one edge of the mask and adapted to fit conformingly against the face of a wearer of the mask.

DETAILED DESCRIPTION

Figure 1:
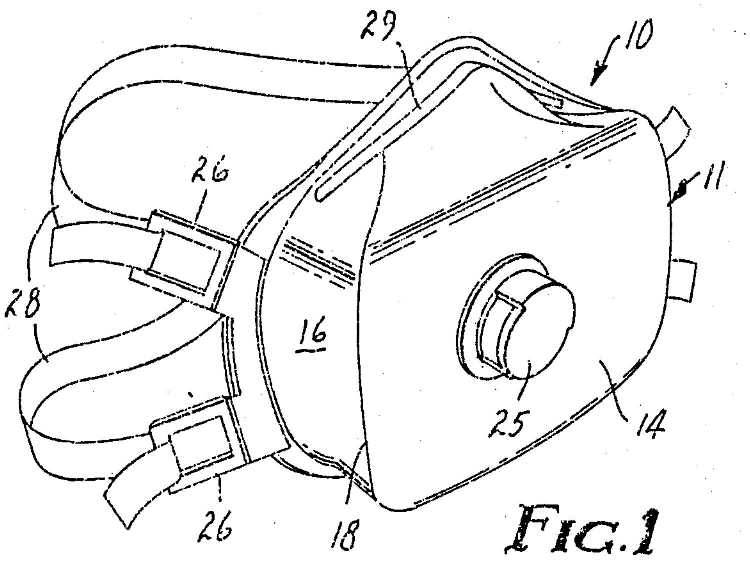
FIG. 1 is a perspective view of a mask of the invention.

Referring to FIG. 1 there is shown a mask 10 of the present invention. The details of the mask 10 can be seen by referring to FIGS. 1–3. The mask 10 generally comprises a filter member 11, and preferably, a cup-shaped inner support 20.

Figure 2:
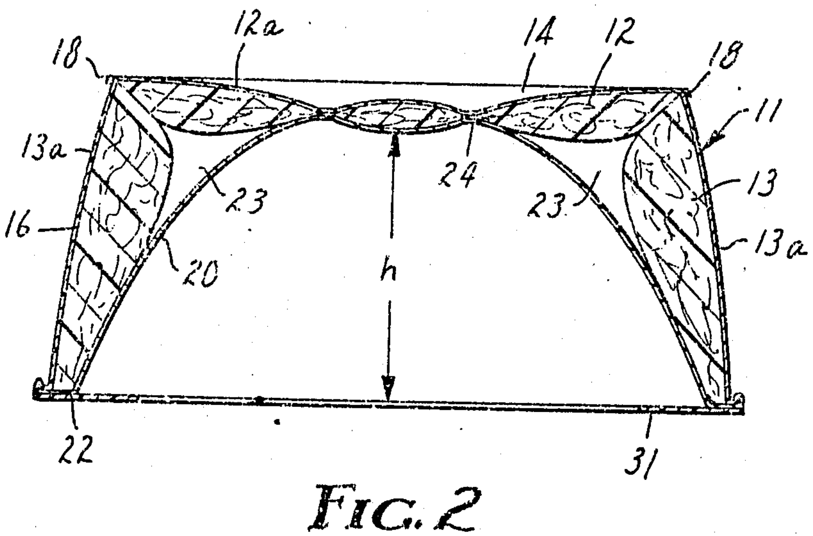
FIG. 2 is a cross-sectional view of another embodiment of this invention.
Figure 3:
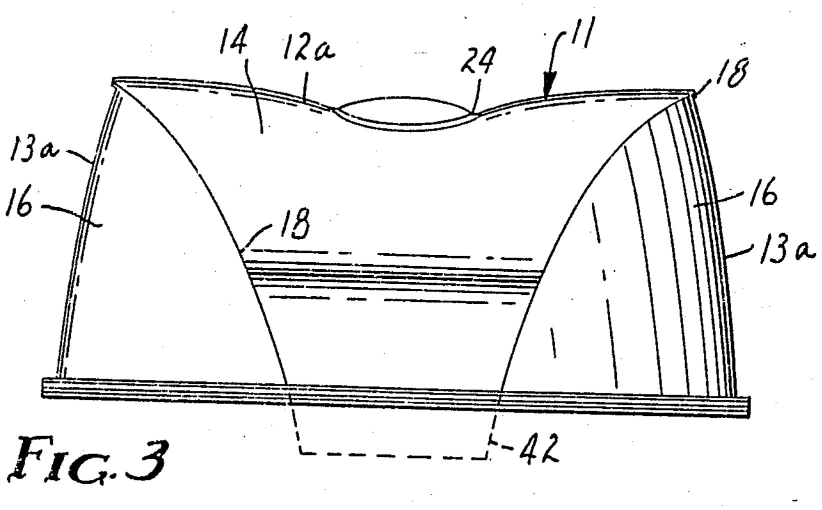
FIG. 3 is a front view of the mask shown in FIG. 2.

The filter member 11 includes a first filter sheet 12, and a second filter sheet 13 (see FIGS. 5 and 7), organized in the finished mask form of FIGS. 1–3 as a frontal portion 14, a pair of side walls 16, and a pair of longitudinally disposed supporting arches 18. The side walls 16 generally project from the face of the wearer. The frontal portion 14 bridges the side walls 16. The side walls 16 and the frontal portion 14 are bonded along a pair of lines which define a pair of support arches 18. The support arches 18 in the embodiment of FIGS. 1–3 have the shape of a segment of a sinusoidal wave form and run in the preferred direction, which is generally parallel to the height of the wearer. The support arches 18 of the embodiment shown in FIGS. 1–3 are symmetrical, oppositely disposed opening towards each other, and have a smoothly curved contour.

The support arches 18 are preferably formed by ultrasonically welding the filter sheets 12, 13 together in the shape of a sine curve. (See the dotted lines 36 of FIG. 4). The smoothly sinusoidal line which results spreads the forces acting on the respirator evenly along the support arches 18. The present invention also includes support arches having other configurations, for example, a number of connected straight segments, lop-sided sine waves, square waves, various shaped curves, or the like.

The frontal portion 14 may be bonded to the side walls 16 by a number of other means besides ultrasonic welding including, for example, adhesive, sewing, thermomechanical, or other suitable means. Any of these means leaves an arched structure of somewhat strengthened or rigidified nature, and extension of the arches to the shape-retaining annular base can further strengthen the arch.

The inner support 20 is preferred, and is included to add further support to the filter member 11, and includes an annular base 22 to which the filter member 11 is attached. The filter member 11 has a larger surface area than the inner support 20 which results in voids or spaces 23 being formed therebetween. That is, the support 20 generally has the shape of a segment of a sphere, whereas the surface area of the filter member 11 is larger than such a segment of a sphere. The segment of the sphere, approximated by the support 20, has the same height as the interior of the filter member, i.e., the dimension h in FIG. 2 extending between the plane of the annular base 22 and the interior of the apex of the mask.

The mask 10 also includes an optional valve 25, typically a diaphragm valve, which allows for the easy exhalation of air by a user. Buckles 26 and straps 28 allow the respirator 10 to be secured to the face of a user. A nose clip 29 made of, for example, a pliable dead-soft band of a metal such as aluminum is preferably included and can be shaped to fit the mask 10 comfortably to a wearer's face.

The filter material of the present invention may be comprised of a number of woven and nonwoven materials, a single or a plurality of layers, and with or without an outer cover or scrim. Examples of suitable filter material include microfibers, fibrillated film webs, woven or nonwoven webs (e.g., air-laid staple fibers), or combinations thereof, comprising, for example, polyolefins, polycarbonates, polyesters, polyurethanes, glass, cellulose or combinations thereof. Electrically charged fibers (See in U.S. Pat. Nos. 4,215,682 or Re. 30,782) are especially preferred. A filter material comprising a plurality of layers of charged blown polyolefin microfibers is preferred, with a charged polypropylene being more preferred. Also, particle loaded webs, and particularly carbon particle or alumina particle loaded webs, such as those described in U.S. Pat. No. 3,971,373, are suitable for filter media of the invention. Masks from particle loaded webs are particularly good for protection from gaseous materials.

The sheets 12, 13 preferably include an outer cover layer **12*a*, 13*a*** respectively which may be made from any woven or non-woven material, and more preferably, is made of polyolefin nonwoven materials. The cover layers protect and contain the filter material, and may serve as an upstream prefilter layer.

Figure 4:
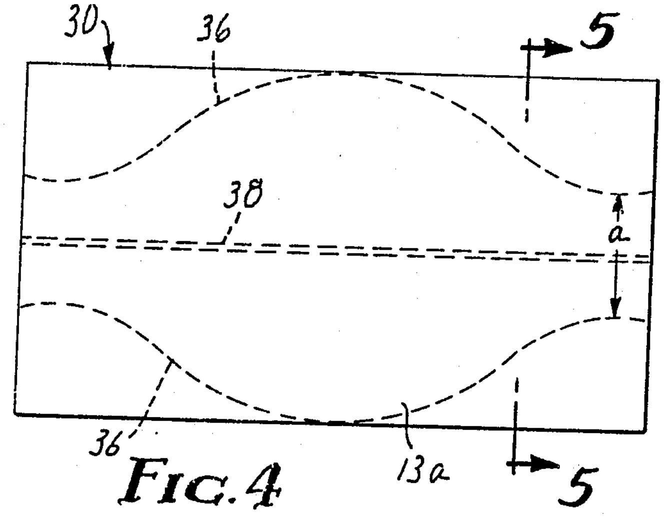
FIG. 4 shows the outline of a mask blank of the present invention before it is cut from two sheets of filter material.
Figure 5:
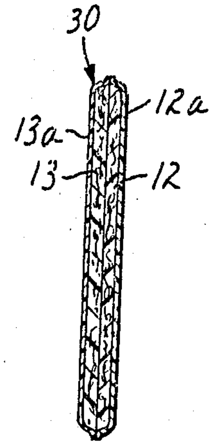
FIG. 5 is a cross sectional view along line 5—5 of FIG. 4 showing the two sheets of filter material.

The production of a mask 10 of the present invention is best described with reference to FIGS. 3–7. FIGS. 4 and 5 show a blank 30 comprising the two sheets of filter material 12 and 13. Each sheet 12, 13 typically consists of a cover layer **12*a*, 13*a*** and one or more layers of filtration media.

Figure 6:
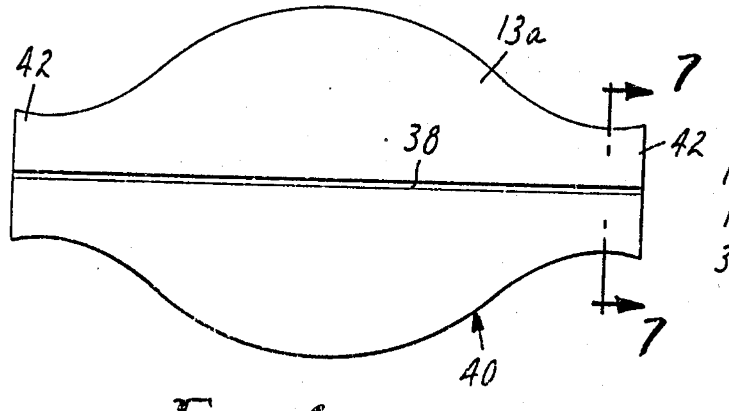
FIG. 6 is an unassembled mask blank of the invention after bonding and cutting along the dotted lines shown in FIG. 4.

The sheets 12 and 13 are bonded and cut along the sinusoidally shaped dotted lines 36 and subsequently slit to form a slot 38. After bonding and cutting along the lines 36, the excess sheet material is removed leaving a center blank portion 40 as shown in FIG. 6. Tabs 42 are removed after the center blank portion 40 is unfolded and bonded to the bottom edge of the inner support 20. A valve 25, buckles 26, straps 28 and nose clip 29 may then be added. The valve 25 is added by forming a ring-like vave pre-weld 24 and punching an opening.

The embodiment described, which includes two filter sheets, is preferred for ease of manufacturing. It is contemplated that many different number of sheets could be used to reach the same results of the teachings of the invention. A single sheet could be folded in two to form two sheets joined along one edge. The edge would be removed during bonding and cutting as shown in FIGS. 4–7 and described herein. Further, two individual sheets separated by a slot could be used in place of the second sheet 13 to obviate the slitting of sheet 13 after bonding and cutting.

The overlapped and bonded edges of the center blank portion 40 and inner support 20 form an annular shape-retaining base 22, i.e., a structure extending around the perimeter of the opening of the mask which tends to hold the blank portion 40 in the opened position. A ring 31 of a preferably soft elastomeric material is preferably included in the annular base 22 to strengthen the base and increase the comfort and conforming fit of the base to a wearer's face.

Masks of the present invention are further described by way of the non-limiting examples below.

EXAMPLE 1

A mask of the present invention was prepared by first preparing first and second filter sheets each comprising a filter laminate consisting of a light spunbond cover web of polypropylene fibers (Softlin Development Brand #6724~33 g/m$^2$, commercially available from Scott Nonwoven, a division of Scotch Paper Co.) and nine layers of approximately 30 g/m$^2$ basis weight electrically charged polypropylene blown microfiber (BMF) web (about 270 g/m$^2$ total basis weight, average fiber diameter of less than about 6 microns). The two sheets were brought together with the BMF layers adjacent to one another.

Figure 7:
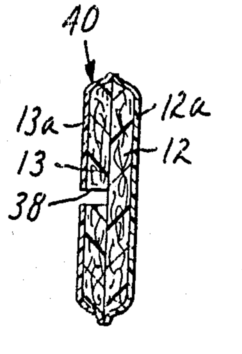
FIG. 7 is a cross-sectional view along the line 7—7 of FIG. 6.

The filter sheets were ultrasonically welded together along two opposing sinusoidal shaped wave forms having an amplitude of about 3.8 cm, a period of about 19 cm and a minimum spacing (indicated by letter "a" in FIG. 4) between the wave forms of about 5 cm. The excess filter material outside of the wave forms was cut away as shown by the lines 36 in FIG. 4. The resulting center blank portion of the filter sheets was laid on a flat surface and the top sheet was slit lengthwise along a centerline between the opposing wave forms to form a slot 28, thus completing a center blank portion as shown in FIGS. 6 and 7.

A cup-shaped inner support shell was fabricated from a dry, fluffy fibrous web having a basis weight of about 200 g/m$^2$ which was made on a "Rando Webber" air-laying machine. The web was a mixture of 60 weight percent crimped drawn polyethylene terephthalate (PET) staple fibers, 6.5 denier and 5.1 cm (2 inches) in length, and 40 weight percent undrawn polyester staple fiber, 5.0 denier and 3.8 cm (1½ inches) in length, which functions as a binder fiber. An approximately 25 cm×25 cm piece of the web was then placed over a heated, rubber coated steel cup shaped male mold and subjected to a uniform molding pressure by a female rubber coated mold having a complementary contour to the male mold. Both mold members were heated to approximately 185° C. and pressure was maintained on the web for approximately 15–30 seconds. The inner support was then sprayed with an acrylic latex (Rhoplex HA-16 available from Rohm and Haas) to an add-on of about 30 weight percent and dried in a circulating air oven at about 100°–145° C. for about 2 minutes.

The masks of the present invention were formed from the center blank portion and the inner support shell by placing the opened center blank portion over the inner support shell with the filter layer adjacent to the support shell. The open edge of the blank was mated with the edge of the support shell by putting this assembly into a female mold, placing a Kraton ring, a butylene-styrene copolymer elastomeric material commerically available from Shell Oil, Co., (17 mils thick) over the blank/shell assembly and ultrasonically welding the three components together by means of a full perimeter seal at the annular base. The tabs were trimmed from the face mask concurrent with the seal formation.

An exhalation valve was then fitted to the face mask at the apex of the inner support shell, immediately in front of the nose and mouth area, by forming the valve pre-weld and punching an opening. Assembly of the mask was completed by attaching a malleable aluminum nose clip and buckles for the head straps. By tightening the straps about the head of a wearer the mask is opened uniformly to provide an expanded filter surface area. The filter members of the mask corresponding to the member 11 in FIGS. 1–3 had an interior surface area of about 220 cm$^2$.

Performance of the mask of the present invention was evaluated by testing for penetration of dioctyl phthalate (DOP) and paraffin oil aerosols through the mask. DOP penetration data was obtained using an Air Techniques, Inc., Model Q127 DOP Penetrometer set at a flow rate of 85 liters per minute and generating an aerosol of 0.3 micron DOP particles at a mass concentration of 100 mg/m$^3$. The DOP penetration was measured by comparison of upstream and downstream aerosol concentrations using light scattering photometry. Paraffin oil penetration data was obtained according to DIN Standard 58645 - Filtering Face Piece, Part III at a flow rate of 95 liters per minute at a mass concentration of 20 mg/m$^2$.

| DOP Data | | Paraffin Oil Data | |
|---|---|---|---|
| % Penetration | Flow Resistance, mmH$_2$O | % Penetration | Flow Resistance, mmH$_2$O |
| 0.003 | 16.5 | 0.062 | 21.3 |

EXAMPLES 2–6

Masks of the invention were made by following the procedure described above except that the number of layers of approximately 50 g/m$^2$ basis weight charged polypropylene BMF were varied and the spacing of the opposing sine wave pattern was reduced to about 3.8 cm, with the following results.

| | | DOP Data | | Paraffin Oil Data | |
|---|---|---|---|---|---|
| Ex. | # Layers | % Penetration | Flow Resistance mmH$_2$O | % Penetration | Flow Resistance mmH$_2$O |
| 2 | 1 | — | — | 24 | 3.5 |
| 3 | 2 | — | — | 5.3 | 6.7 |
| 4 | 4 | 0.085 | 11.9 | 0.37 | 14.5 |
| 5 | 6 | 0.004 | 18.3 | 0.055 | 25.0 |
| 6 | 8 | <0.001 | 30.0 | 0.005 | 36.0 |

EXAMPLE 7

A mask of the present invention was made by again repeating the procedure of Example 1 with the construction of Example 5 except that the inner support shell was not included in the assembly of the mask. The mask had a paraffin oil percent penetration of 0.050 and flow resistance of 22.4 mm H$_2$O at 95 liters/minute of air flow.

I claim:

1. A method for producing a mask blank comprising the steps of:

bonding two sheets of filter material together along a pair of oppositely disposed arches, one of said sheets having a slot lying between said arches;

removing the sheet lying outside of said arches to form a filter blank;

opening said filter blank along said slot so as to form a cup-like filter member having a pair of side wall portions formed from said sheet having a slot and a frontal portion formed from the other sheet which bridges said sidewall portions.

2. The method of claim 1 further including the step of forming a shape retaining annular base disposed around one edge of said mask and adapted to fit conformingly against the face of a wearer of the mask.

3. The method of claim 1 wherein said sheets are bonded together using ultrasonic welding.

4. The method of claim 1 wherein said arches are symmetrical.

5. The method of claim 1 wherein said arches generally have the shape of a segment of a sinusoidal wave.

6. The method of claim 1 further comprising the step of mounting an exhalation valve on said frontal portion.

7. The method of claim 1 wherein said shape retaining annular base is formed by overlapping and bonding the edges of said cup-like filter member and an inner support.

8. The method of claim 1 further comprising the step of attaching a ring of soft, elastomer to said one edge of said mask.

9. The method of claim 1 wherein said filter material is comprised of a material selected from the group consisting of microfiber webs, fibrillated film webs, air-laid staple fibers, and combinations thereof.

10. The method of claim 9 wherein said filter material is comprised of a material selected from the group consisting of polyolefins, polycarbonates, polyesters, polyurethanes, polyamides, glass, cellulose, and combinations thereof.

11. The method of claim 1 wherein said filter material comprises a plurality of layers of charged blown microfibers.

12. The method of claim 11 wherein said blown microfibers comprise charged polyolefin.

13. The method of claim 12 wherein said blown microfibers comprise charged polypropylene.

* * * * *

UNITED STATES PATENT AND TRADEMARK OFFICE

CERTIFICATE OF CORRECTION

PATENT NO. : 4,883,547

DATED : November 28, 1989

INVENTOR(S) : Daniel A. Japuntich

It is certified that error appears in the above-identified patent and that said Letters Patent is hereby corrected as shown below:

Col. 5, line 1, "slot 28" should read --slot 38--.

Signed and Sealed this

Sixth Day of August, 1991

*Attest:*

HARRY F. MANBECK, JR.

*Attesting Officer*

*Commissioner of Patents and Trademarks*